United States Patent
Howe et al.

(10) Patent No.: US 10,583,820 B2
(45) Date of Patent: Mar. 10, 2020

(54) EFFLUENT PROCESSING APPARATUS AND METHOD FOR A VEHICLE AIR BRAKE CHARGING SYSTEM

(71) Applicant: Bendix Commercial Vehicle Systems LLC, Elyria, OH (US)

(72) Inventors: Stephen Howe, Cuyahoga Falls, OH (US); David W Perry, North Ridgeville, OH (US); Gregory R Ashley, Amherst, OH (US); Fred W Hoffman, Wakeman, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 160 days.

(21) Appl. No.: 15/720,558

(22) Filed: Sep. 29, 2017

(65) Prior Publication Data

US 2019/0100190 A1 Apr. 4, 2019

(51) Int. Cl.
*B01D 45/00* (2006.01)
*B60T 17/00* (2006.01)
(Continued)

(52) U.S. Cl.
CPC ............ *B60T 17/004* (2013.01); *B01D 46/16* (2013.01); *B01D 53/24* (2013.01); *B01D 53/26* (2013.01);
(Continued)

(58) Field of Classification Search
CPC .......... B01D 19/00–0495; B01D 46/00; B01D 46/16; B01D 53/24; B01D 53/26;
(Continued)

(56) References Cited

U.S. PATENT DOCUMENTS 3,161,490 A 12/1964 Dudek
3,200,568 A 8/1965 McNeil
(Continued)

FOREIGN PATENT DOCUMENTS

CN 105251320 A 1/2016
DE 102006002975 B4 * 1/2008 ......... B01D 19/0042
(Continued)

OTHER PUBLICATIONS

European Patent Office, International Search Report and Written Opinion of the International Searching Authority, Report, dated Dec. 12, 2018, 10 pages, European Patent Office, Rijswijk Netherlands.
(Continued)

*Primary Examiner* — T. Bennett McKenzie
(74) *Attorney, Agent, or Firm* — Cheryl Greenly; Brian Kondas; Eugene Clair

(57) ABSTRACT

An effluent processing apparatus is provided for a vehicle air brake charging system. The effluent processing apparatus comprises an inlet port through which effluent from a purge valve of an air dryer can be received and an outlet port. The effluent processing apparatus also comprises a spiral-shaped effluent channel having a portion of decreasing channel width disposed between the inlet port and the outlet port. The spiral-shaped effluent channel is provided for increasing velocity of an effluent stream as the effluent stream flows through the decreasing channel width portion of the spiral-shaped effluent channel.

10 Claims, 14 Drawing Sheets

(51) Int. Cl.
  *B60T 13/66* (2006.01)
  *B01D 53/24* (2006.01)
  *B01D 53/26* (2006.01)
  *B60T 13/68* (2006.01)
  *B01D 46/16* (2006.01)
  *F15B 21/048* (2019.01)
  *B01D 45/12* (2006.01)

(52) U.S. Cl.
  CPC .......... *B01D 53/266* (2013.01); *B60T 13/662* (2013.01); *B60T 13/683* (2013.01); *F15B 21/048* (2013.01); *B01D 45/12* (2013.01); *B01D 2259/4566* (2013.01)

(58) Field of Classification Search
  CPC .......... B01D 53/266; B01D 2259/4566; B01D 45/12–16; B60T 17/004; B60T 13/662; B60T 13/683; F15B 21/048
  USPC .............. 95/241–266; 96/214–217; 55/385.3
  See application file for complete search history.

(56) References Cited

U.S. PATENT DOCUMENTS

| | | | |
|---|---|---|---|
| 3,339,350 A | 9/1967 | Sims | |
| 3,572,008 A | 3/1971 | Hankison | |
| 4,361,425 A | 11/1982 | Hata | |
| 5,186,522 A | 2/1993 | Spencer | |
| 6,109,289 A | 8/2000 | Firth | |
| 6,319,296 B1 | 11/2001 | Fornof | |
| 6,537,339 B2 | 3/2003 | Schmitz | |
| 6,730,143 B1 | 5/2004 | Nichols | |
| 7,708,793 B2 | 5/2010 | Fornof | |
| 7,753,069 B2 | 7/2010 | Nichols | |
| 7,789,925 B2 | 9/2010 | Fornof | |
| 9,101,856 B2 | 8/2015 | Quinn | |
| 9,656,198 B2 | 5/2017 | Sugio | |
| 2009/0101558 A1 | 4/2009 | Wang | |
| 2017/0340997 A1 | 11/2017 | Otsuka | |

FOREIGN PATENT DOCUMENTS

| | | |
|---|---|---|
| DE | 102006002975 B4 | 1/2008 |
| EP | 0919277 A1 | 6/1999 |
| EP | 2471588 B1 | 11/2014 |
| EP | 3216509 A1 | 9/2017 |
| FR | 2224211 A1 | 10/1974 |
| GB | 1094617 A | 12/1967 |
| JP | 20050664470 A | 3/2005 |

OTHER PUBLICATIONS

Bendix Commercial Vehicle Systems, "SD-08-187 Bendix PuraGuard System Filter," Service Data Sheet, Jul. 2004, 8 pages, Bendix Commercial Vehicle Systems LLC, Elyria Ohio, U.S.A.

Choi, Sung-Jin et al. "A Polymethylsiloxane (PDMS) Sponge for the Selective Absorption of Oil from Water," Paper, Nov. 10, 2011, 5 pages, American Chemical Society, U.S.A.

Parker Hannifin Manufacturing Limited, "OVR Oil Vapour Removal Filter," Product Information Sheet, Apr. 2015, 4 pages, Parker Hannifin Manufacturing Limited, England.

\* cited by examiner

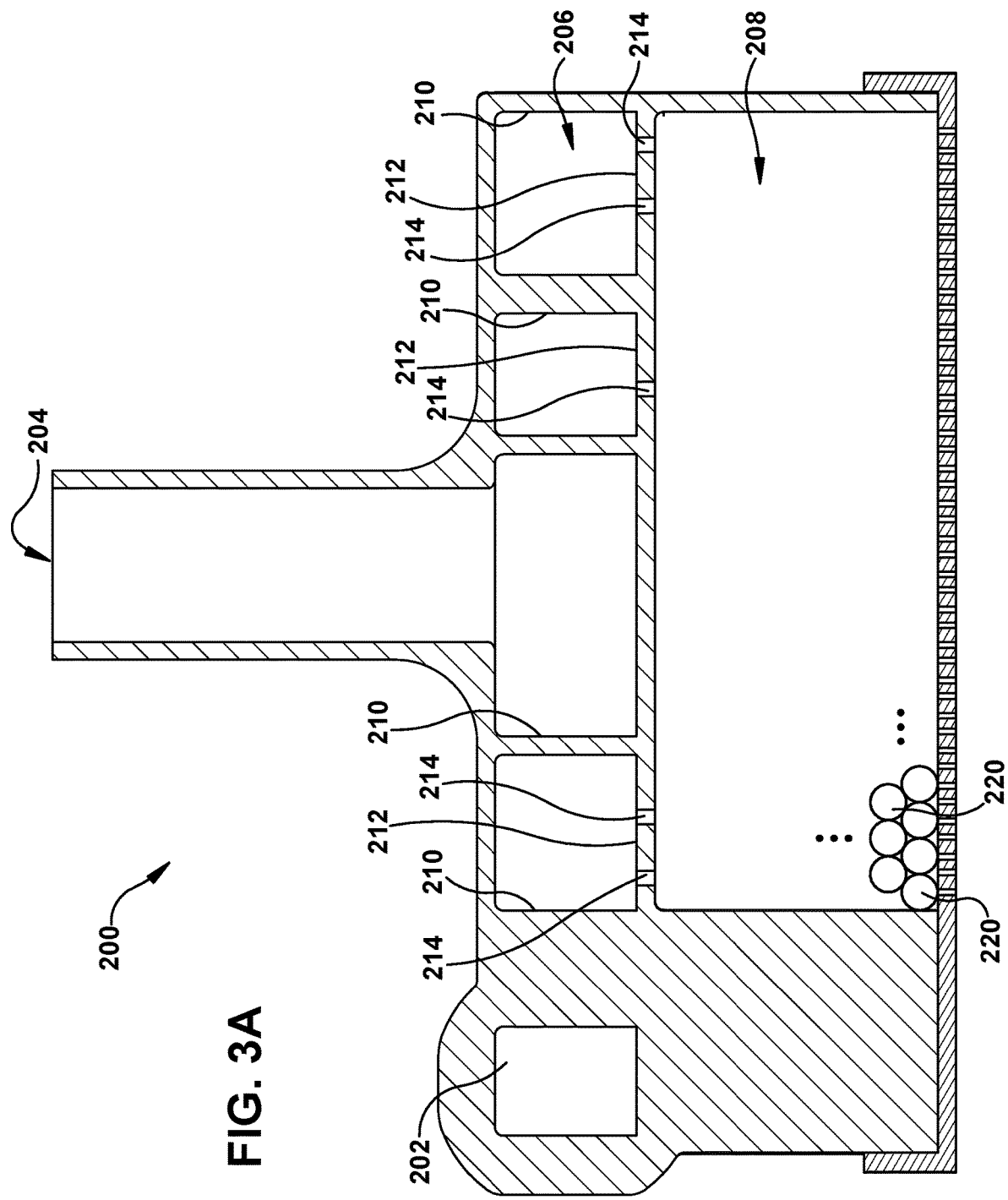

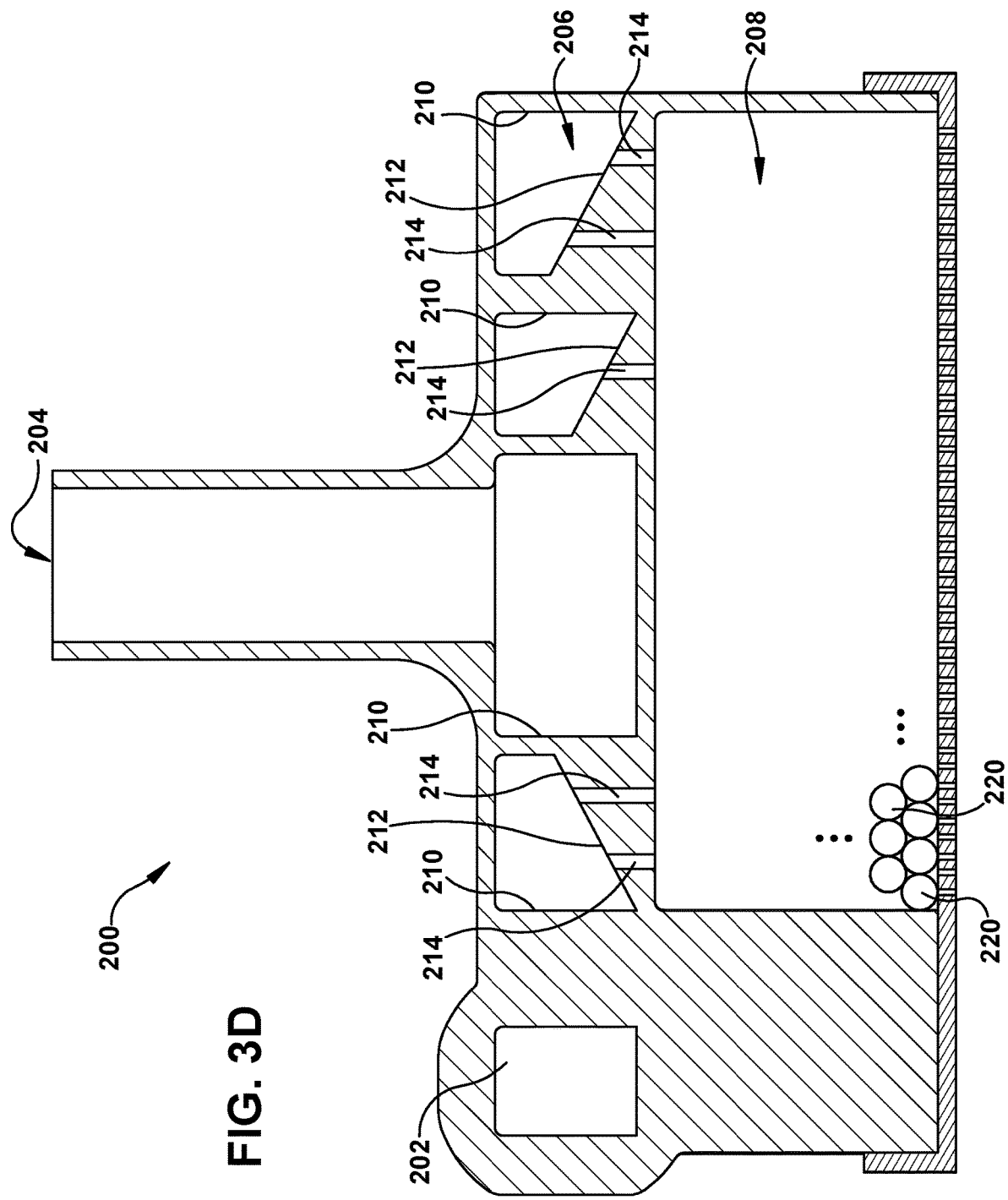

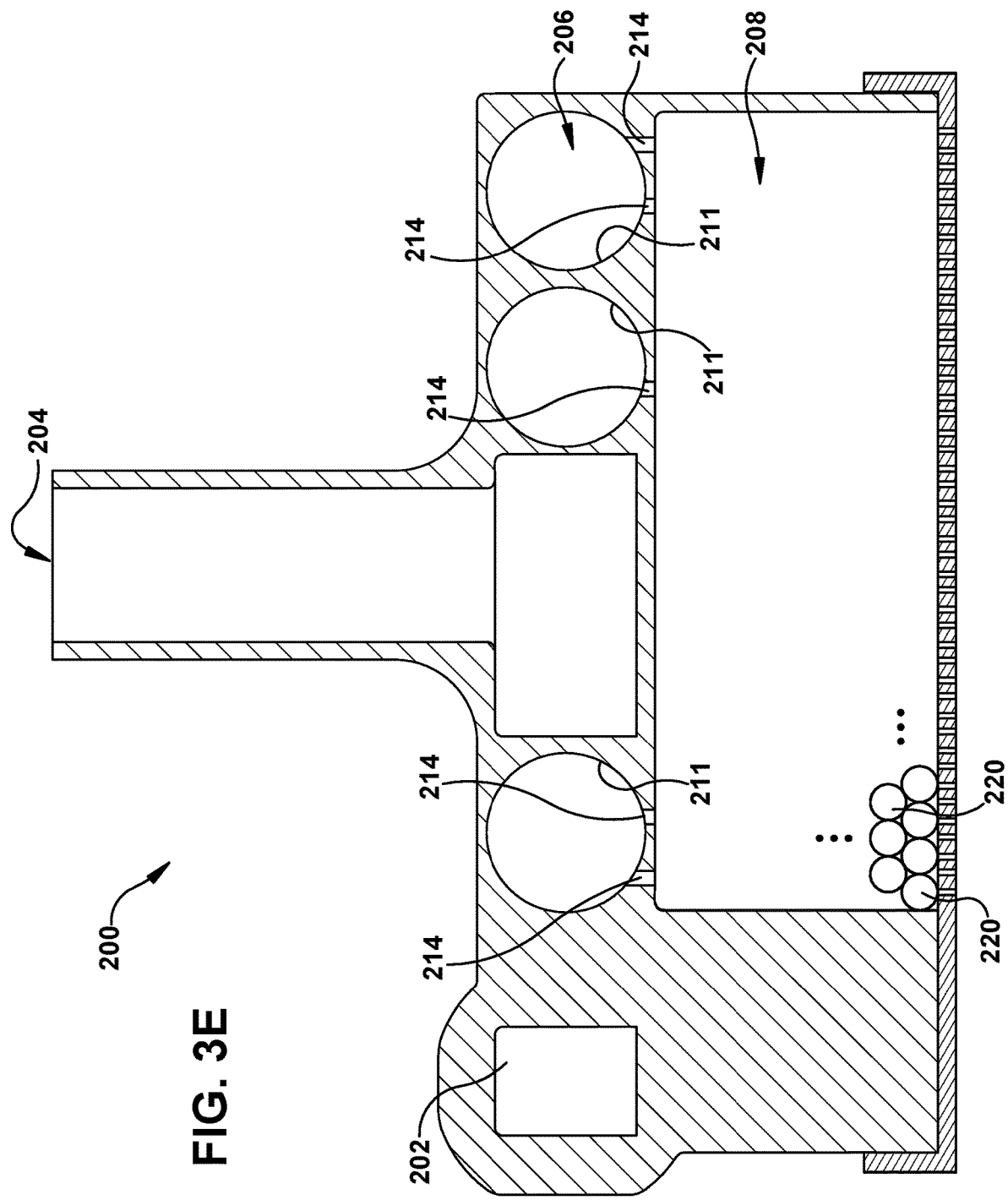

EFFLUENT PROCESSING APPARATUS AND METHOD FOR A VEHICLE AIR BRAKE CHARGING SYSTEM

BACKGROUND

The present application relates to vehicle air brake charging systems, and is particularly directed to an effluent processing apparatus and method for a vehicle air brake charging system, such as a truck air brake charging system.

A truck air brake charging system includes a vehicle air compressor which builds air pressure for an air braking system. The compressor is typically lubricated by an engine oil supply. A governor controls system air pressure between a preset maximum and minimum pressure level by monitoring the air pressure in a supply reservoir. When the supply reservoir air pressure becomes greater than that of a preset "cut-out" setting of the governor, the governor controls the compressor to stop the compressor from building air and also causes an air dryer downstream from the compressor to go into a purge mode. As the supply reservoir air pressure drops to a preset "cut-in" setting of the governor, the governor returns the compressor back to building air and the air dryer to air drying mode.

The air dryer is an in-line filtration system that removes both water vapor and oil droplets from the compressor discharge air after it leaves the compressor. This results in cleaner, drier air being supplied to the air braking system, and aids in the prevention of air line and component freeze ups in winter weather. The air dryer typically uses a replaceable cartridge containing a desiccant material and an oil separator. Most of the oil droplets are removed by the oil separator as the air passes into the air dryer. The air then moves through the desiccant material which removes most of the water vapor.

When the air pressure in the supply reservoir reaches the preset cut-out setting of the governor, the governor makes the compressor stop building air and allows the air dryer's "purge cycle" to begin. During the purge cycle, the desiccant material is regenerated (i.e., its ability to remove water is renewed) by a reversal of the saturation process. A small amount of dry air passes back through the desiccant material and the water that has been collected, as well as any oil droplets collected by the oil separator, are purged out through a purge valve to atmosphere. Since the purged air from the purge valve contains oil droplets, this results in depositing of oil onto roadways by the truck. Accordingly, those skilled in the art continue with research and development efforts in cleaning the purged air from purge valves.

SUMMARY

In accordance with one embodiment, an effluent processing apparatus is provided for a vehicle air brake charging system. The effluent processing apparatus comprises an inlet port through which effluent from a purge valve of an air dryer can be received and an outlet port. The effluent processing apparatus also comprises a spiral-shaped effluent channel having a portion of decreasing channel width disposed between the inlet port and the outlet port. The spiral-shaped effluent channel is provided for increasing velocity of an effluent stream as the effluent stream flows through the decreasing channel width portion of the spiral-shaped effluent channel.

In accordance with another embodiment, an effluent processing apparatus is provided for a vehicle air brake charging system. The effluent processing apparatus comprises an inlet port through which effluent from a purge valve of an air dryer can be received and an outlet port. The effluent processing apparatus also comprises a spiral-shaped effluent channel extending between the inlet port and the outlet port. The spiral-shape effluent channel is provided for extracting contaminants from an effluent stream as the effluent stream flows from the inlet port through the spiral-shaped effluent channel to the outlet port. The spiral-shaped effluent channel includes a floor extending between the inlet port and the outlet port. The floor has floor openings that are distributed along the extent of the spiral-shaped effluent channel between the inlet port and the outlet port to form a drainage pattern between the inlet port and the outlet port.

In accordance with yet another embodiment, an effluent processing apparatus is provided for a vehicle air brake charging system. The effluent processing apparatus comprises an inlet port through which effluent from a purge valve of an air dryer can be received and an outlet port. The effluent processing apparatus also comprises a spiral-shaped effluent channel extending from the inlet port to the outlet port. The spiral-shaped effluent channel is provided for extracting contaminants from an effluent stream as the effluent stream flows from the inlet port through the effluent channel to the outlet port. The spiral-shaped effluent channel includes means for varying rate of extraction of contaminants from the effluent stream as the effluent stream flows from the inlet port to the outlet port.

In accordance with still another embodiment, a method is provided of operating an effluent processing apparatus to remove contaminants from an effluent stream from a purge valve of an air dryer as the effluent stream flows from an inlet port through an effluent channel to an outlet port. The method comprises applying a centrifugal force on contaminants in the effluent stream as the effluent stream enters the input port to remove larger contaminants from the effluent stream. The method also comprises continuously increasing the applied centrifugal force on contaminants in the effluent stream as the effluent stream flows through a portion of the effluent channel to the outlet port to remove smaller contaminants from the effluent stream.

BRIEF DESCRIPTION OF THE DRAWINGS

FIGS. 3A, 3B, 3C, 3D, 3E, and 3F are each a sectional elevation view taken approximately along line 3-3 shown in FIG. 2, and showing a cross-sectional profile of a spiral-shaped effluent processing channel in accordance with an example implementation.

DETAILED DESCRIPTION

Figure 1:
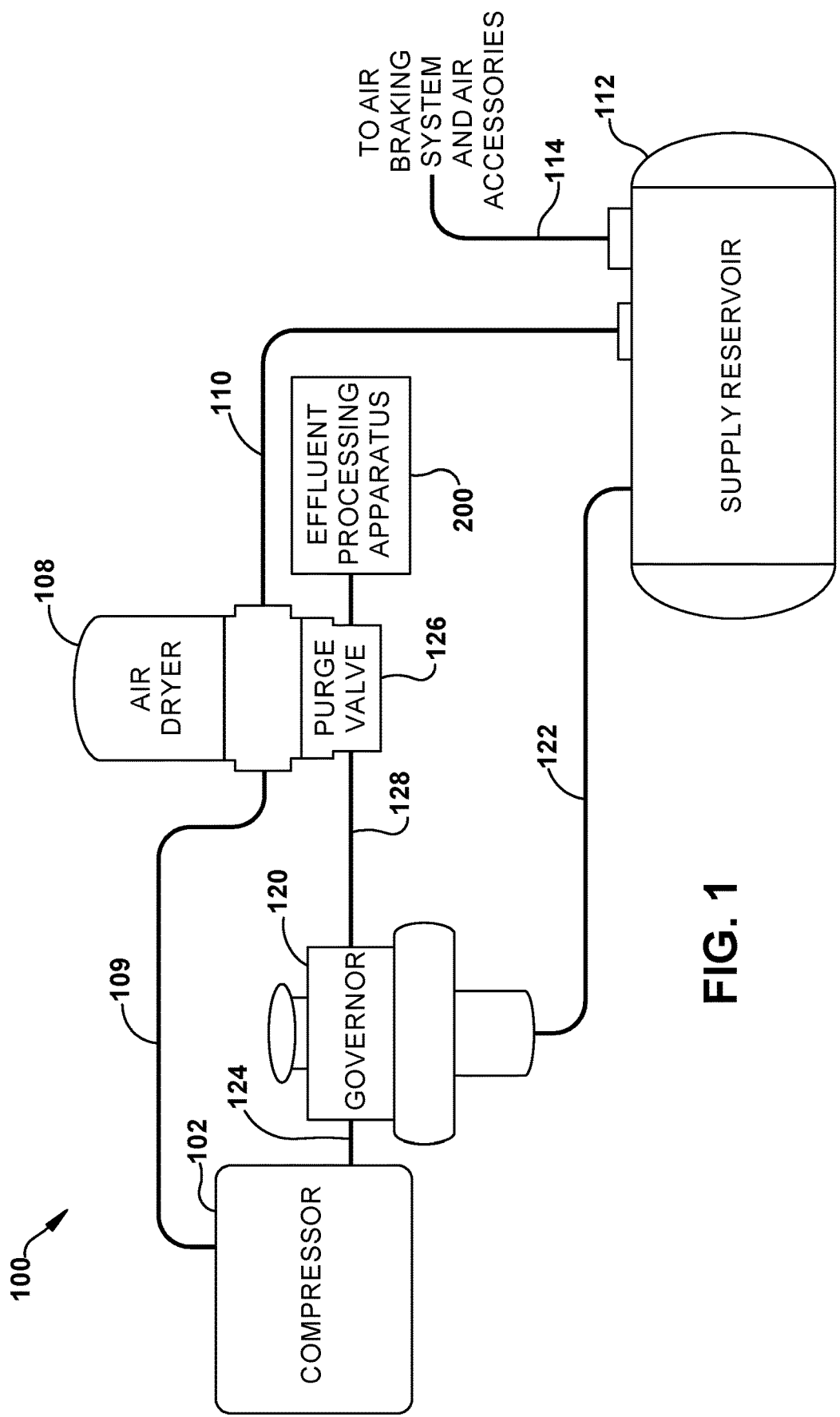
FIG. 1 is a schematic diagram of a vehicle air brake charging system including an effluent processing apparatus constructed in accordance with an embodiment.

Referring to FIG. 1, a schematic diagram of a vehicle air brake charging system 100 including an effluent processing apparatus 200 constructed in accordance with an embodiment is illustrated. Vehicle air brake charging system 100 includes an air compressor 102 that generates compressed air in conventional manner. Structure and operation of air compressors are known and, therefore, will not be described.

A first discharge line 109 is pneumatically connected between the compressor 102 and an air dryer 108. A second discharge line 110 is pneumatically connected between the air dryer 108 and a supply reservoir 112. Air supply line 114 is pneumatically connected between the supply reservoir 112 and air braking system and air accessories (not shown) of the vehicle.

A governor 120 controls system air pressure between a preset maximum and minimum pressure level by monitoring the air pressure in pneumatic control line 122 from the supply reservoir 112. When air pressure in the supply reservoir 112 becomes greater than that of a preset "cut-out" setting of the governor 120, the governor controls the compressor 102 on pneumatic control line 124 to stop the compressor from building air. The governor 120 also controls a purge valve 126 on pneumatic control line 128 to purge air from the air dryer 108 in a purge mode. When air pressure in the supply reservoir 112 drops to a preset "cut-in" setting of the governor 120, the governor returns the compressor 102 back to building air and the air dryer 108 to an air drying mode.

Figure 2:
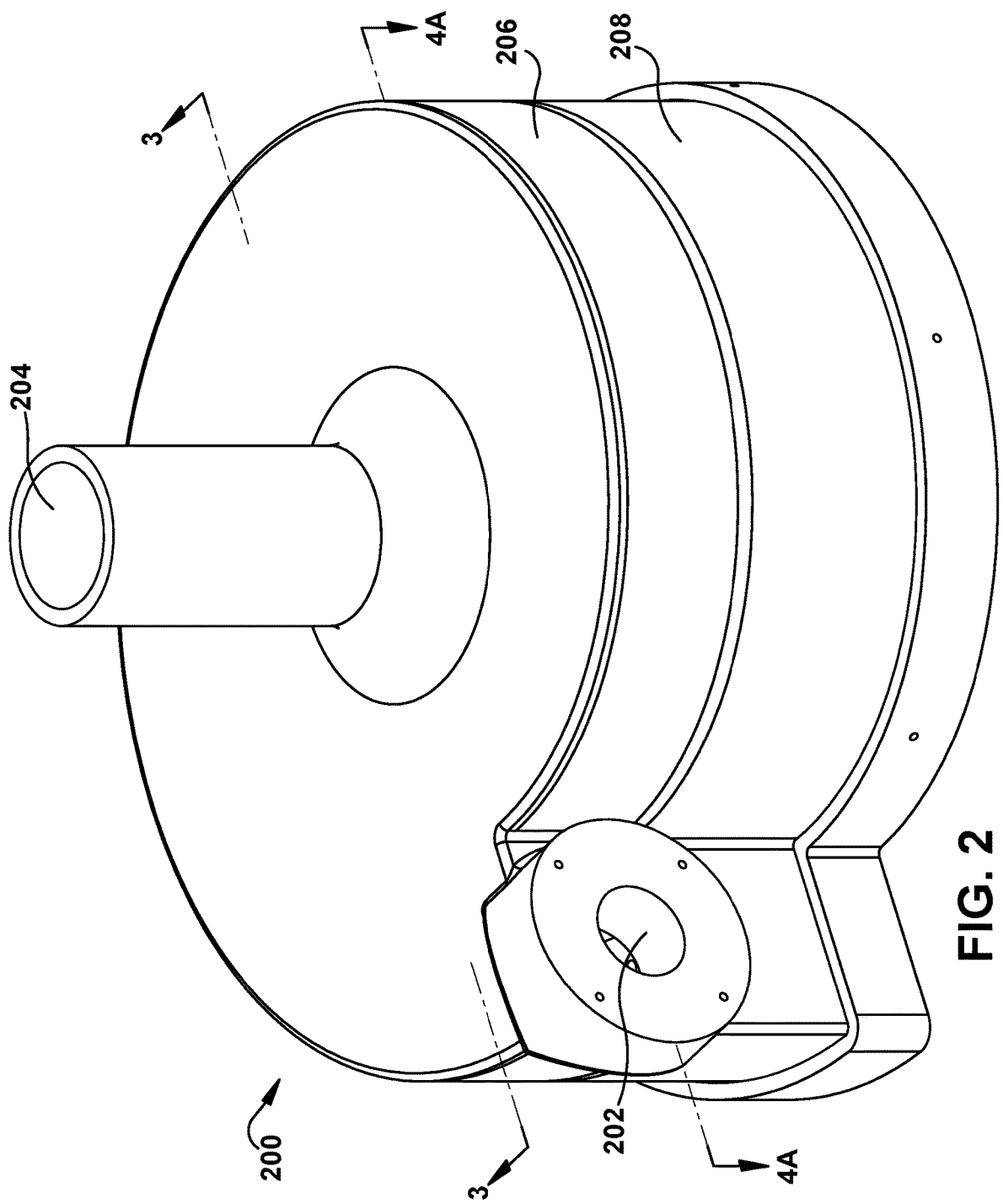
FIG. 2 is a perspective view of the effluent processing apparatus shown in FIG. 1.

Referring to FIG. 2, a perspective view of an example effluent processing apparatus 200 shown in FIG. 1 is illustrated. The effluent processing apparatus 200 includes an inlet port portion 202, an outlet port portion 204 located above the inlet port portion 202, a spiral-shaped effluent processing channel portion 206, and a separating sump portion 208, as will be described hereinbelow. Example overall physical dimensions of the effluent processing apparatus 200 are about six inches (15.2 centimeters) in diameter and about four inches (10.2 centimeters) in height. A minimum diameter would be about two inches (5.1 centimeters) to provide a sufficient flow path and to avoid back pressure.

Referring to FIG. 3A, a sectional elevation view taken approximately along line 3-3 shown in FIG. 2 is illustrated. FIG. 3A shows a cross-sectional profile of the spiral-shaped channel 206 in accordance with an example implementation. FIG. 4A is a sectional perspective view taken approximately along line 4A-4A shown in FIG. 2, and shows details of the spiral-shaped channel 206. FIG. 5 is a top elevational view, looking approximately into the page in FIG. 4, and shows details of a decreasing channel width of the spiral-shaped channel 206.

As shown in FIGS. 3A, 4A, and 5, the spiral-shaped channel 206 includes a continuous wall 210 extending between the inlet port 202 and the outlet port 204. The continuous wall 210 is provided for extracting contaminants from an effluent stream as the effluent stream flows from the inlet port 202 through the spiral-shaped channel 206 to the outlet port 204. More specifically, the contaminants in the effluent stream impact the continuous wall 210 due to centrifugal force. As a result, the contaminants adhere to the continuous wall 210 and eventually drain to the separating sump portion 208. Contaminants in the effluent stream include, but are not limited to, water vapor and oil droplets in an aerosol. In some embodiments, a select one of a fine mesh, sponge, and coalescing media may be coated and/or adhered on the continuous wall 210 for increasing contaminant extraction efficiency of the continuous wall 210.

As best shown in FIG. 5, the spiral-shaped channel 206 has a decreasing radius extending from the inlet port 202 to the outlet port 204. The spiral-shaped channel 206 also has a relatively larger channel width portion (designated with letter "X") and a relatively smaller channel width portion (designated with letter "Y"). The channel width decreases from X to Y (and also from Y onwards to the center of the spiral) according to an exponential function (i.e., an exponential decreasing function). The relatively larger channel width portion X is closer to the inlet port 202, and the relatively smaller channel width portion Y is farther away from the inlet port 202. Accordingly, the effluent stream flows through the effluent channel 206 with a smaller and smaller channel width as the effluent stream flows from the relatively larger channel width portion X to the relatively smaller channel width portion Y.

It should be noted that the channel width of the effluent channel 206 does not start to decrease until the effluent stream flowing from the inlet port 202 in the effluent channel 206 reaches approximately the point marked X in FIG. 5 as the relatively larger channel width portion. In this regard, the channel width is smaller at the inlet port 202 to prevent flow separation. The channel width then widens until it reaches maximum channel width at X. The maximum channel width at X depends upon the diameter of the inlet port 202. As an example with a maximum channel width of about 0.8 inches (2.0 centimeters), the channel width will grow from the input port 202 to 0.8 inches, and then continuously decrease until reaching minimum channel width at the outlet port 204 at the center of the spiral. This design prevents flow separation at the inlet port that would increase drag.

Figure 6:
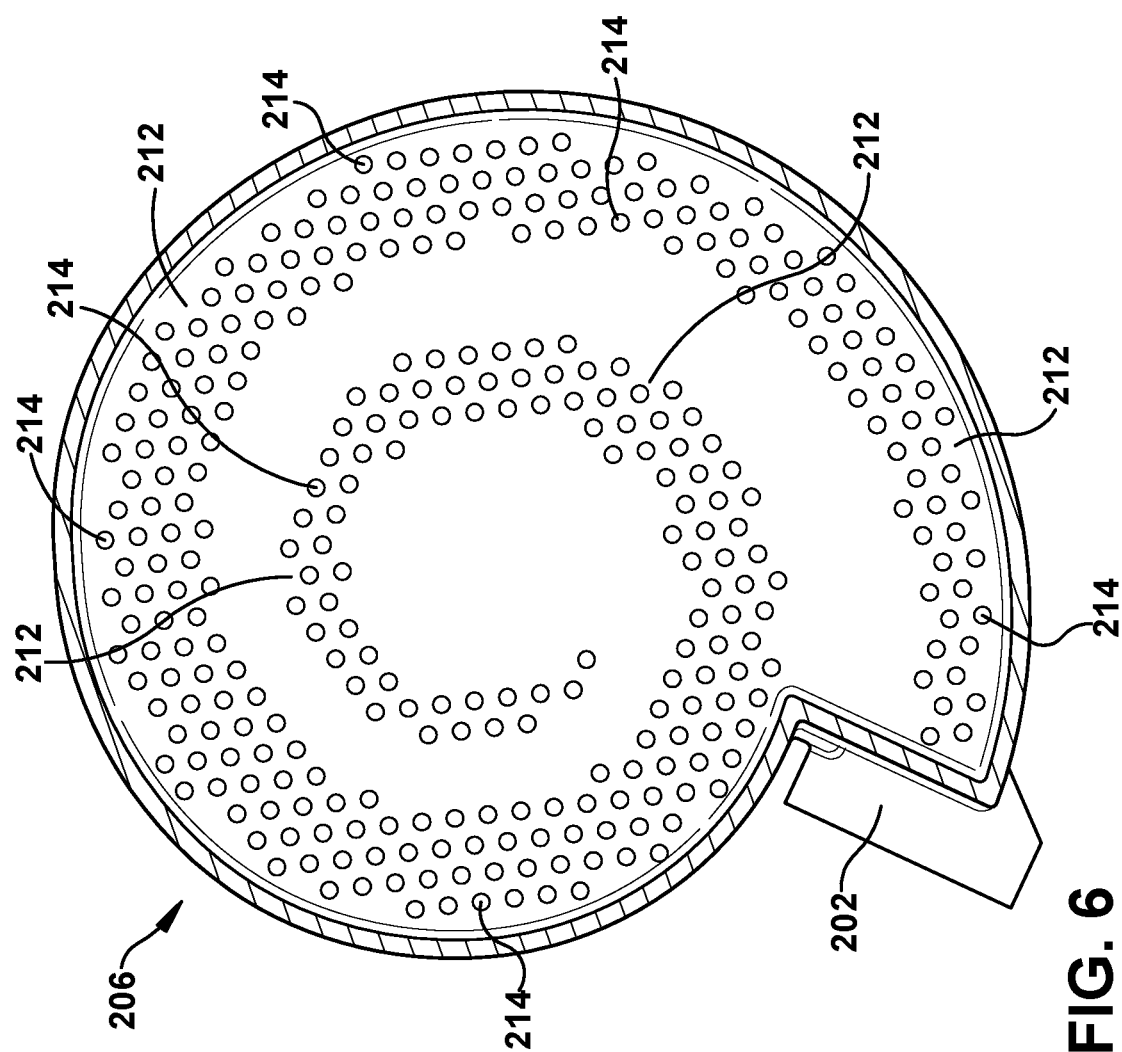
FIG. 6 is a bottom elevational view, looking approximately out of the page in FIG. 4, and showing details of floor openings in the spiral-shaped effluent processing channel.

Referring to FIG. 6, a bottom elevational view looking approximately out of the page in FIG. 4A is illustrated. FIG. 6 shows details of floor openings 214 in a floor 212 of the spiral-shaped channel 206. The floor 212 extends between the inlet port 202 and the outlet port 204, and separates the spiral-shaped channel 206 and the separating sump 208. The floor openings 214 in the floor 212 are distributed along the extent of the spiral-shaped channel 206 to form a spiral-shaped drainage pattern between the inlet port 202 and the outlet port 204, as shown in FIG. 6. The floor 212 intersects the continuous wall 210 to provide a channel cross-sectional profile that is substantially rectangular as shown in FIG. 3A.

Referring again to FIGS. 4A and 5, the floor 212 includes a ramp portion 216 disposed at substantially center of the spiral-shaped channel 206. The outlet port 204 (FIG. 3) is disposed above the ramp portion 216 at substantially center of the spiral-shaped channel 206. The ramp portion 216 provides a surface against which the effluent stream that has been processed through the spiral-shaped channel 206 can be deflected upwards toward the outlet port 204. The cleaned air (i.e., the effluent with contaminants removed) then passes through the outlet port 204 to atmosphere.

As best shown in FIG. 3A, the separating sump portion 208 contains filtration media, designated as small circles "220" in the lower left corner of the separating sump 208. In some embodiments, the filtration media 220 includes a sponge material. In some embodiments, the filtration media 220 includes a generic hydrophobic material. The effluent processing apparatus 200 is intended to be mounted horizontally to promote the flow of contaminants to the separating sump 208.

The separating sump 208 is disposed below the floor 212 of the spiral-shaped channel 206. The separating sump 208 is provided for receiving and holding extracted contaminants from the effluent stream that has flowed through the spiral-shaped channel 206 until the extracted contaminants can be removed from the separating sump 208. In some embodiments, the separating sump 208 containing the filtration media 220 is detachable as a cartridge from the spiral-shaped channel 206 to allow the separating sump 208 to be removed as a unit and replaced with another separating sump.

During operation of the effluent processing apparatus 200, effluent (i.e., air containing oil and water in the form of liquid and aerosol) from the purge valve 126 of the air dryer 108 is forced through the inlet port 202 into the spiral-shaped channel 206 of decreasing radius. As the effluent flows through the spiral-shaped channel 206, centrifugal force causes the heavier aerosols and liquid droplets to impact the continuous wall 210. The decreasing radius and increasing constriction of the spiral-shaped channel 206 due to the decreasing channel width causes the effluent stream to accelerate. The increased velocity of the effluent stream increases the fraction of aerosol that falls out of the effluent stream.

As liquids fall out of the effluent stream, the liquids run down the continuous wall 210 and drain through the floor openings 214 in the floor 212 into the volume of the separating sump 208 containing the filtration media 220. The filtration media 220 holds the contaminants (i.e., the oil and the water) until the filtration media 220 or the separating sump 208, or both, are replaced. The effluent stream with the contaminants removed then impacts the ramp portion 216 in the center of the spiral-shaped channel 206, which deflects the effluent stream upwards and out through the outlet port 204 to atmosphere.

Figure 4A:
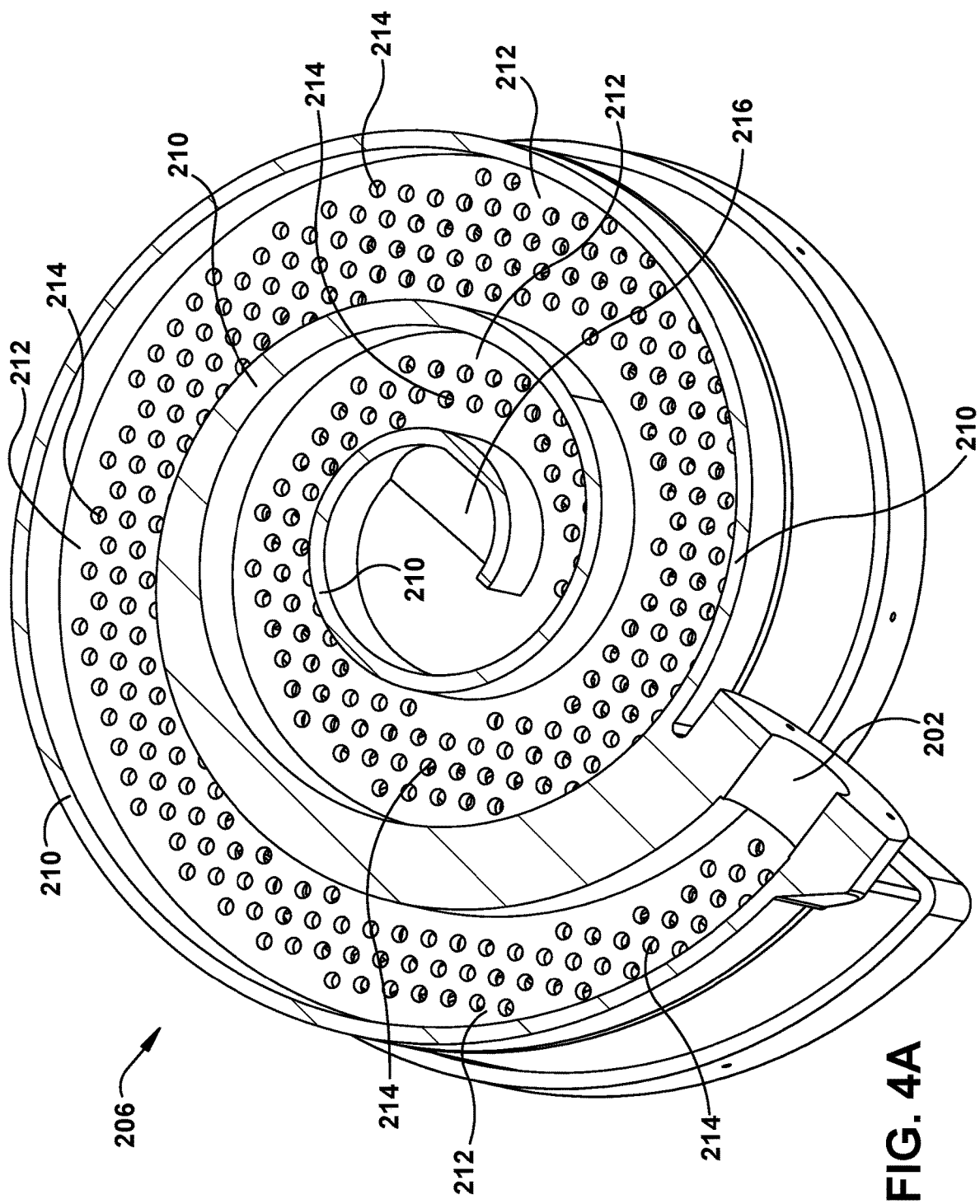
FIG. 4A is a sectional perspective view taken approximately along line 4A-4A shown in FIG. 2, and showing details of a spiral-shaped effluent processing channel in the effluent processing apparatus.
Figure 4B:
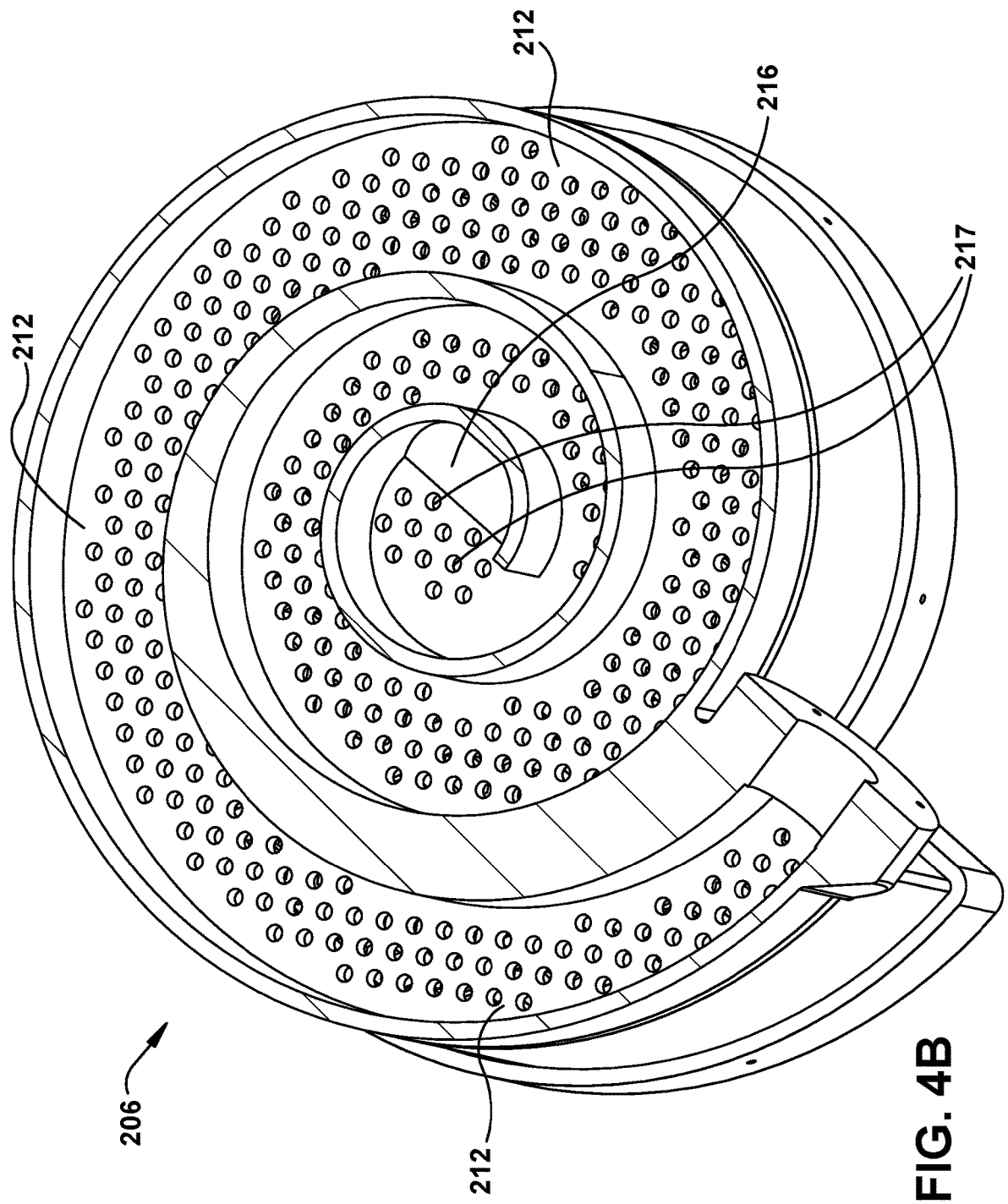
FIG. 4B is a sectional perspective view similar to FIG. 4A, and showing a spiral-shaped effluent processing channel in accordance with another embodiment.
Figure 5:
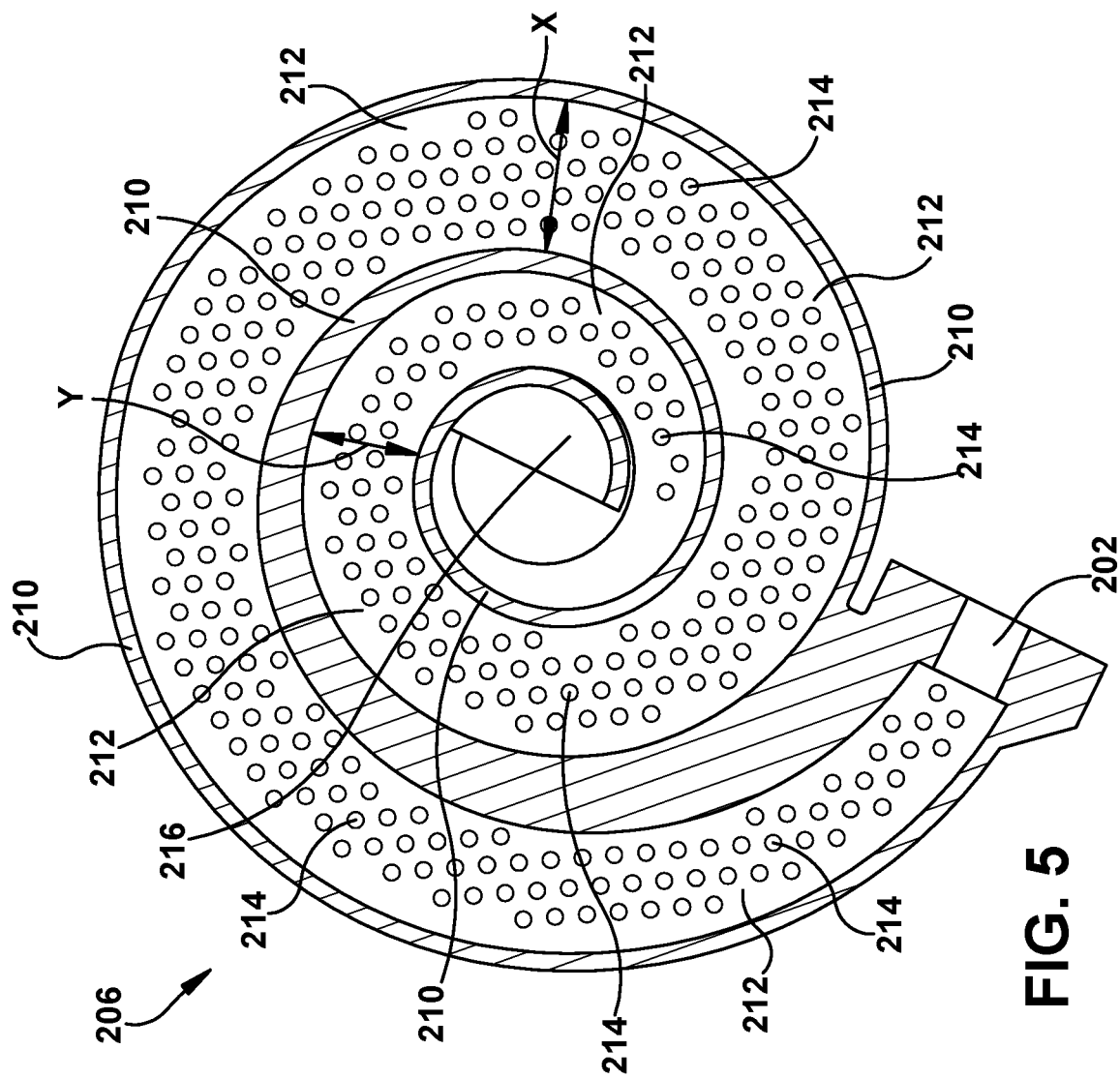
FIG. 5 is a top elevational view, looking approximately into the page in FIG. 4, and showing details of a decreasing channel width of the spiral-shaped effluent processing channel.

Referring to FIG. 4B, a sectional perspective view similar to FIG. 4A shows another embodiment of the spiral-shaped channel 206. In particular as shown in FIG. 4B, the floor 212 of the spiral-shaped channel 206 has floor openings 217 that are located at bottom of the ramp portion 216. The floor openings 217 at the bottom of the ramp portion 216 provide additional drainage capability of contaminants, especially contaminants that impact the ramp portion 216.

Figure 7:
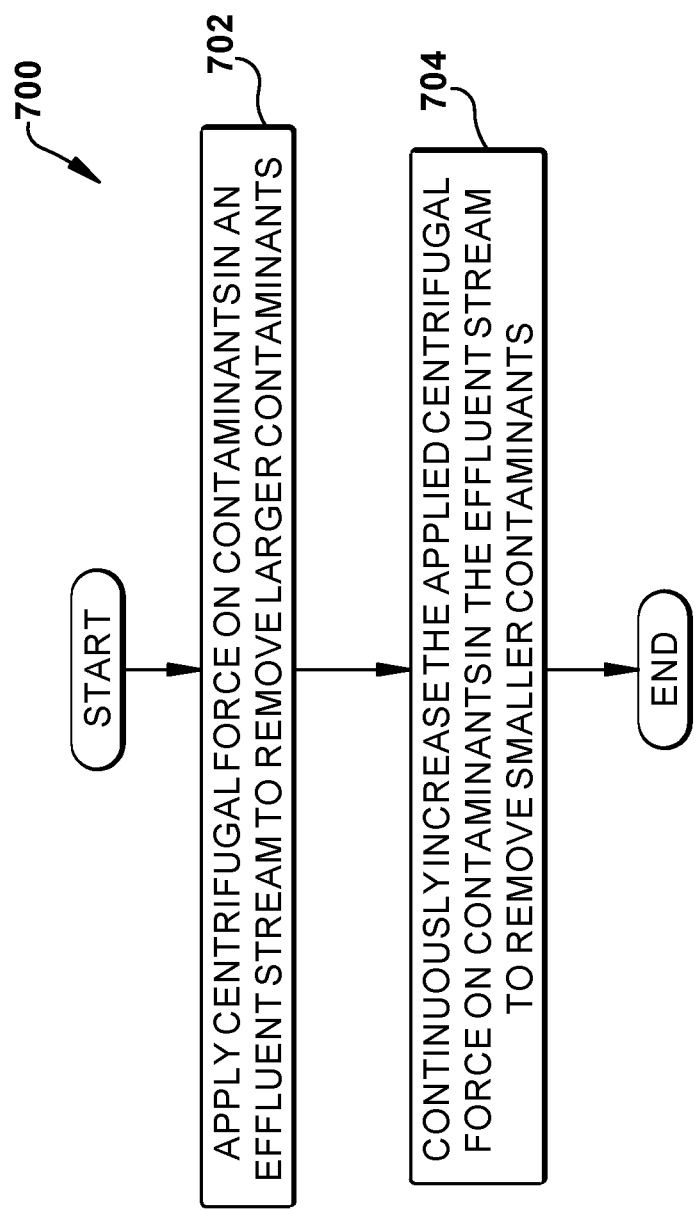
FIG. 7 is a flow diagram depicting a method for operating an effluent processing apparatus in accordance with an embodiment.

Referring to FIG. 7, a flow diagram 700 depicting a method for operating an effluent processing apparatus to remove liquid aerosol contaminants from an effluent stream from a purge valve of an air dryer as the effluent stream flows from an inlet port through an effluent channel to an outlet port in accordance with an embodiment is illustrated. In block 702, a centrifugal force is applied on contaminants in the effluent stream as the effluent stream enters the input port to remove larger contaminants from the effluent stream. Then in block 704, the applied centrifugal force is continuously increased on contaminants in the effluent stream as the effluent stream flows through a portion of the effluent channel to the outlet port to remove smaller contaminants from the effluent stream.

In some embodiments, the applied centrifugal force is continuously increased on contaminants in the effluent stream as the effluent stream flows through an exponentially decreasing channel width portion of the effluent channel to the outlet port to remove smaller contaminants from the effluent stream.

In some embodiments, the method further comprises deflecting the effluent stream with both larger and smaller contaminants removed upwards toward the outlet port to atmosphere.

In some embodiments, the method further comprises draining both the removed larger contaminants and the removed smaller contaminants downwards through floor openings into a volume of a separating sump containing filtration media.

Figure 8:
FIG. 8 is a velocity streamline diagram depicting an example effluent flow pattern along the spiral-shaped effluent processing channel shown in FIGS. 3A, 4, and 5.

Referring to FIG. 8, a velocity streamline diagram 800 depicting an example effluent flow pattern into the inlet port 202 and through the spiral-shaped channel 206 to the outlet port 204 is illustrated. In general, the streamlines flow in the direction indicated by the solid arrows beginning at the inlet port 202, passing through the spiral-shaped channel 206, and ending at the outlet port 204. The velocity range of the streamlines shown in FIG. 8 is between about 0.15 millimeters per second at the slowest and about 9.64 meters per second at the fastest.

As shown in FIG. 8, the streamlines of different velocities cross each other as the streamlines flow from the input port 202 through the spiral-shaped channel 206 to the outlet port 204. With the channel 206 being spiral-shaped, the direction of the effluent stream stays nearly the same. Also, with the channel 206 decreasing in channel width from its maximum channel width at X, the velocity of the effluent stream increases, which increases the centrifugal force. The increasing centrifugal force increases likelihood of smaller contaminants in the effluent stream impacting the continuous wall 210. This results in the smaller contaminants falling out of the effluent stream, and subsequently draining into the separating sump 208. Thus, by using an effluent channel that is spiral-shaped and has a channel width portion which decreases from its maximum channel width (e.g., at X shown in FIG. 5) to its minimum channel width at center of the spiral, both larger and smaller contaminants are extracted from an effluent stream and drained into a separating sump.

It should be apparent that the velocity of the effluent stream increases as the effluent flows from the inlet port 202 to the outlet port 204 which, in turn, increases extraction of contaminants from the effluent stream. It should also be apparent that the spiral-shaped distribution of the drainage floor openings 214 in the floor 212 allows for better distribution of effluent over the bed of the filtration media 220 in the separating volume of the separating sump 208. As such, one section of the filtration media 220 is not singularly exposed to all of the effluent. The result is cleaner air being expelled to atmosphere, and less oil being deposited and accumulated on roadways.

It should further be apparent that the effluent processing apparatus 200 comprises two processing stages. The spiral-shaped channel 206 comprises a first processing stage, and the separating sump 208 provides a second processing stage. With two processing stages, the effluent processing apparatus 200 produces minimal back pressure on the purge valve 126 (FIG. 1). Moreover, since the effluent processing apparatus 200 is not pressurized, either the first processing stage or the second processing stage, or both, can be made of plastic material. In some embodiments, the entire effluent processing apparatus 200 comprises plastic material.

It should also be apparent that the effluent processing apparatus 200 shown in FIG. 2 has a shape with a relatively low profile and relatively small overall physical dimensions. This allows the effluent processing apparatus 200 to be more easily installed in applications where available installation space is relatively tight. It is conceivable that the effluent processing apparatus 200 may have other profile shapes and other overall physical dimensions depending upon the needs of the particular application.

Figure 3B:
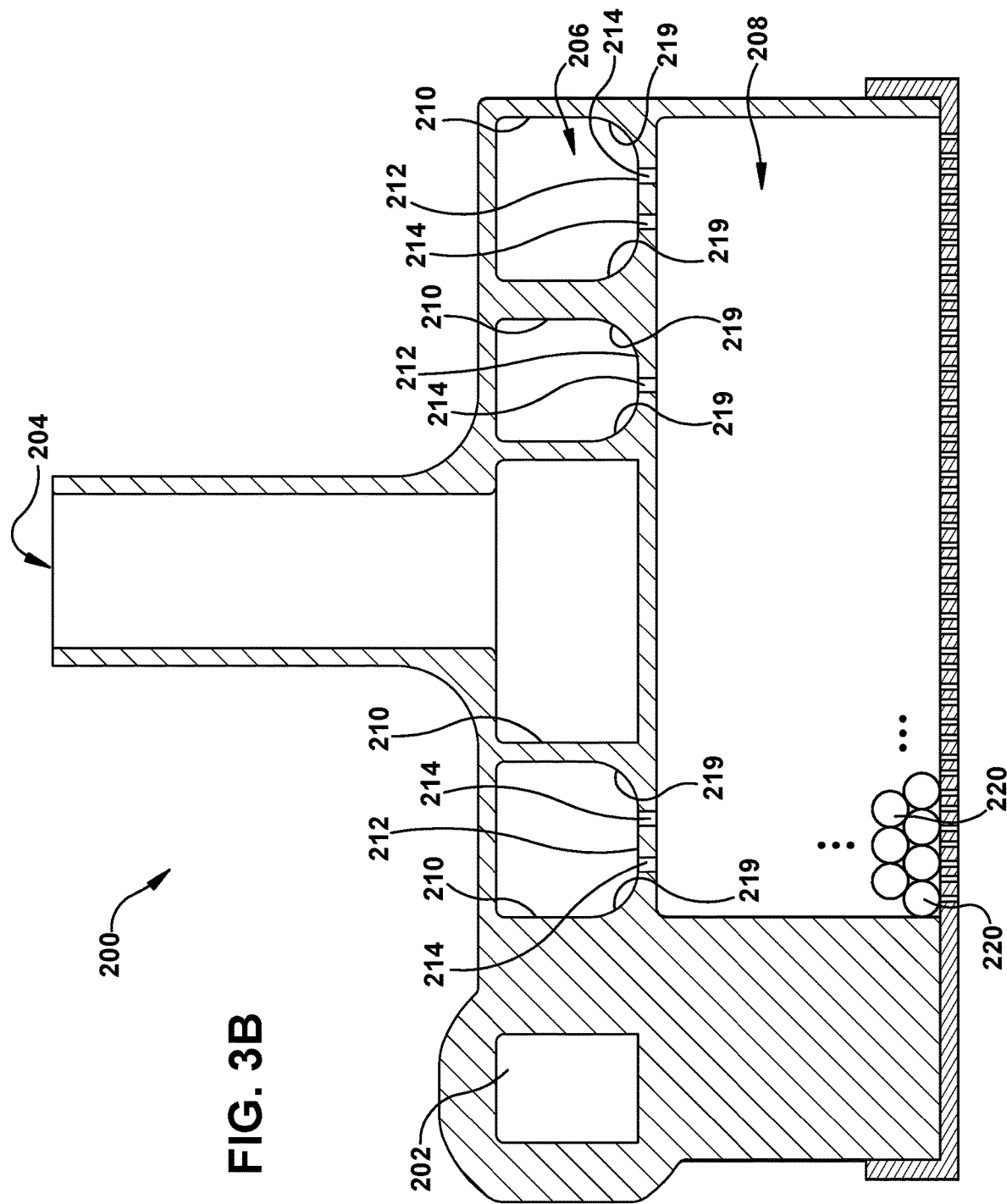

Although the above description describes the spiral-shaped channel 206 having a channel cross-sectional profile that is substantially rectangular (as shown in FIG. 3A), it is conceivable that other cross-sectional profiles are possible. As another example implementation as shown in FIG. 3B, one or more fillets 219 are disposed between the continuous wall 210 and the floor 212 to provide a smooth transitional surface between the continuous wall 210 and the floor 212. The rate of extraction of contaminants from the effluent stream is varied by the one or more fillets 219.

Figure 3C:
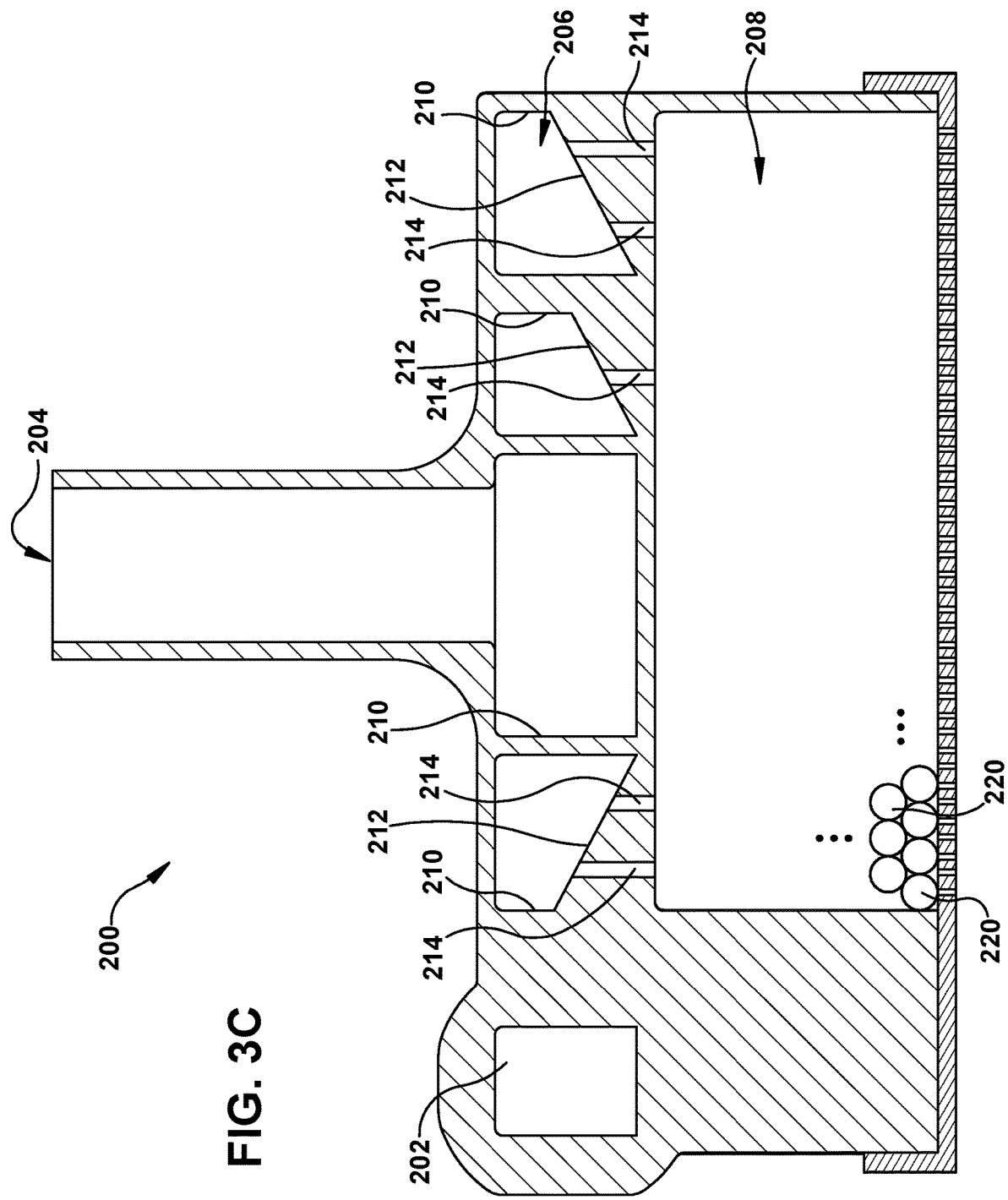

As another example implementation as shown in FIG. 3C, the floor 212 is sloped and intersects the continuous wall 210 to provide a channel cross-sectional profile with the floor 212 sloping inwards toward center of the spiral-shaped effluent channel. The rate of extraction of contaminants from the effluent stream is varied by the inward sloping floor 212.

As yet another example implementation as shown in FIG. 3D, the floor 212 is sloped and intersects the continuous wall 210 to provide a channel cross-sectional profile with the floor sloping outwards away from center of the spiral-shaped effluent channel. The rate of extraction of contaminants from the effluent stream is varied by the outward sloping floor 212.

As still another example implementation as shown in FIG. 3E, an endless tubular surface 211 provides a channel cross-sectional profile that is substantially circular. The endless tubular surface 211 functions both as a wall and as a floor. The rate of extraction of contaminants from the effluent stream is varied by the substantially circular cross-sectional profile of the effluent channel 206.

Figure 3F:
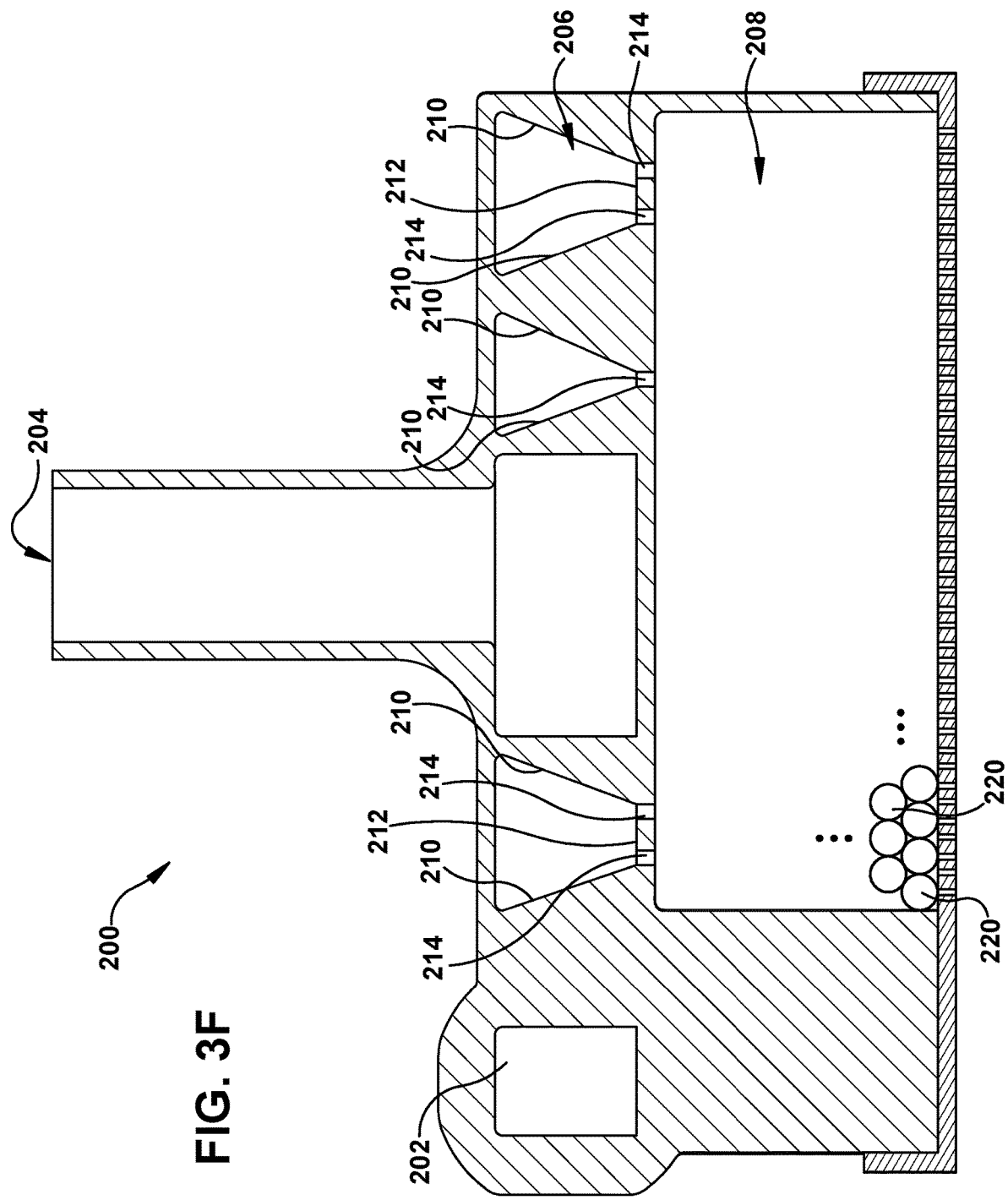

As another example implementation as shown in FIG. 3F, the continuous wall 210 is sloped and intersects the floor 212 to provide a channel cross-sectional profile with the continuous wall 210 sloping downwards toward the floor 212. The slope of the continuous wall 210 is designed mainly to aid in drainage of the liquids. The rate of extraction of contaminants from the effluent stream may also be varied by the downward sloping continuous wall 210.

Further although the above-description describes the effluent processing apparatus 200 being used in a heavy vehicle such as a truck, it is conceivable that the effluent processing apparatus 200 may be used in other types of heavy vehicles, such as busses for example.

While the present invention has been illustrated by the description of example processes and system components, and while the various processes and components have been described in detail, applicant does not intend to restrict or in any way limit the scope of the appended claims to such detail. Additional modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. An effluent processing apparatus for a vehicle air brake charging system, the effluent processing apparatus comprising:
   an inlet port through which effluent from a purge valve of an air dryer can be received; an outlet port; and
   a spiral-shaped effluent channel having a portion of decreasing channel width disposed between the inlet port and the outlet port and for increasing velocity of an effluent stream as the effluent stream flows through the decreasing channel width portion of the spiral-shaped effluent channel;
   wherein the effluent processing apparatus further comprises a separating sump containing filtration media disposed below the spiral-shaped effluent channel and for receiving and holding extracted contaminants until the extracted contaminants can be removed from the separating sump;
   wherein the spiral-shaped effluent channel of decreasing channel width includes a floor extending between the inlet port and the outlet port and having floor openings that lead to the separating sump;
   wherein the floor openings are distributed along the extent of the spiral-shaped effluent channel to allow drainage from the spiral-shaped effluent channel into the separating sump;
   wherein (i) the floor includes a ramp portion disposed at substantially center of the spiral-shaped effluent channel, and (ii) the outlet port is disposed above the ramp portion at substantially center of the spiral-shaped effluent channel.

2. An effluent processing apparatus according to claim 1, wherein the spiral-shaped effluent channel of decreasing channel width includes a continuous wall extending between the inlet port and the outlet port and for extracting contaminants from the effluent stream.

3. An effluent processing apparatus according to claim 2, further comprising:
   a select one of a fine mesh, sponge, and coalescing media is coated or adhered on the continuous wall and for increasing contaminant extraction efficiency of the continuous wall.

4. An effluent processing apparatus according to claim 1, wherein the separating sump containing filtration media is detachable as a cartridge from the spiral-shaped effluent channel to allow the separating sump to be removed as a unit and replaced with another separating sump.

5. An effluent processing apparatus according to claim 1, wherein the entire effluent processing apparatus comprises plastic material.

6. An effluent processing apparatus for a vehicle air brake charging system, the effluent processing apparatus comprising:
   an inlet port through which effluent from a purge valve of an air dryer can be received;
   an outlet port; and
   a spiral-shaped effluent channel extending between the inlet port and the outlet port and for extracting contaminants from an effluent stream as the effluent stream flows from the inlet port through the spiral-shaped effluent channel to the outlet port, wherein the spiral-shaped effluent channel includes a floor extending between the inlet port and the outlet port and having floor openings that are distributed along the extent of the spiral-shaped effluent channel between the inlet port and the outlet port to form a drainage pattern between the inlet port and the outlet port; wherein (i) the floor includes a ramp portion disposed at substantially center of the spiral-shaped effluent channel, and (ii) the outlet port is disposed above the ramp portion at substantially center of the spiral-shaped effluent channel.

7. An effluent processing apparatus according to claim 6, wherein the floor includes floor openings that are located at a bottom of the ramp portion.

8. An effluent processing apparatus according to claim 6, further comprising:

a separating sump containing filtration media disposed below the drainage pattern of the floor of the spiral-shaped effluent channel and wherein the separating sump is provided for receiving and holding extracted contaminants until the extracted contaminants can be removed from the separating sump.

9. An effluent processing apparatus according to claim 8, wherein the separating sump containing filtration media is detachable as a cartridge from the spiral-shaped effluent channel to allow the separating sump to be removed as a unit and replaced with another separating sump.

10. An effluent processing apparatus according to claim 8, wherein the entire processing apparatus comprises plastic material.

* * * * *